T. SCOTT.
Coin-Press.

No. 211,595. Patented Jan. 21, 1879.

Attest:
Clarence Poole
Rich K. Evans.

Inventor:
Thomas Scott
per attys
A. H. Evans & Co.

2 Sheets—Sheet 2.
T. SCOTT.
Coin-Press.
No. 211,595. Patented Jan. 21, 1879.
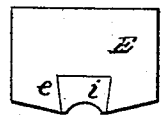
Fig. 3.
Fig. 4.
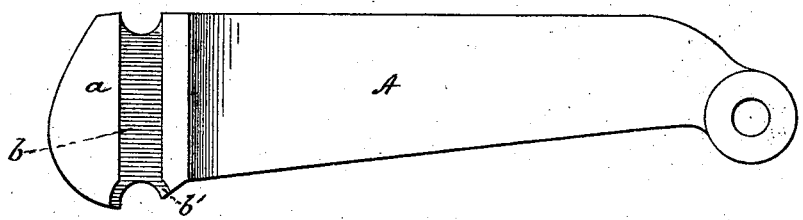
Fig. 5.
Fig. 6. Fig. 7.
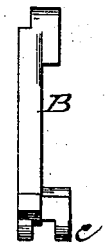
Fig. 8.
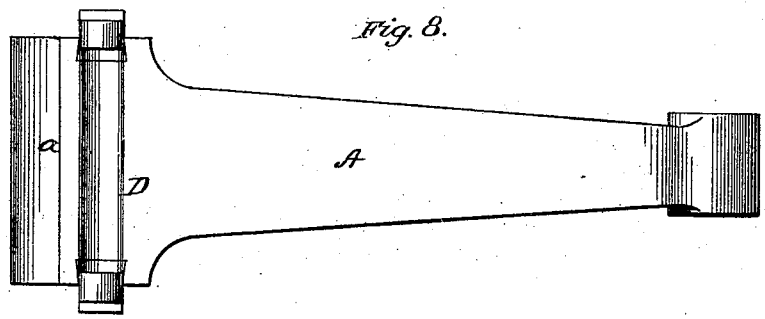
Attest:
Clarence Poole
R. N. Evans
Inventor:
Thomas Scott
per attys
A. N. Evans & Co.

UNITED STATES PATENT OFFICE.

THOMAS SCOTT, OF SAN FRANCISCO, CALIFORNIA.

IMPROVEMENT IN COIN-PRESSES.

Specification forming part of Letters Patent No. 211,595, dated January 21, 1879; application filed June 3, 1878.

*To all whom it may concern:*

Be it known that I, THOMAS SCOTT, of the city and county of San Francisco, State of California, have invented certain new and valuable Improvements in Coin-Presses, of which the following is a clear, full, and exact description, reference being had to the accompanying drawings, in which—

Figure 1:
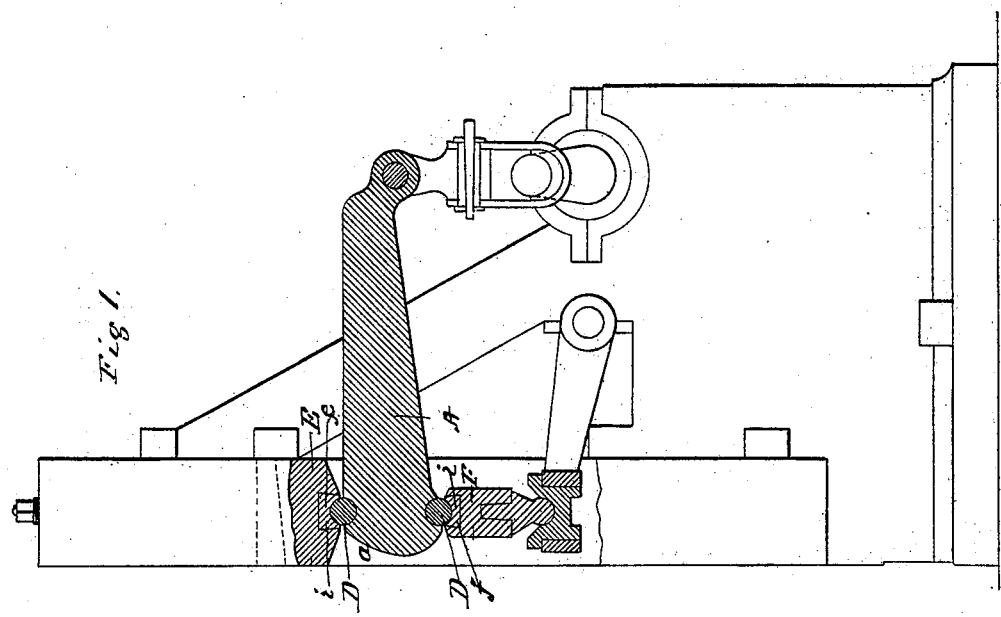
Figure 2:
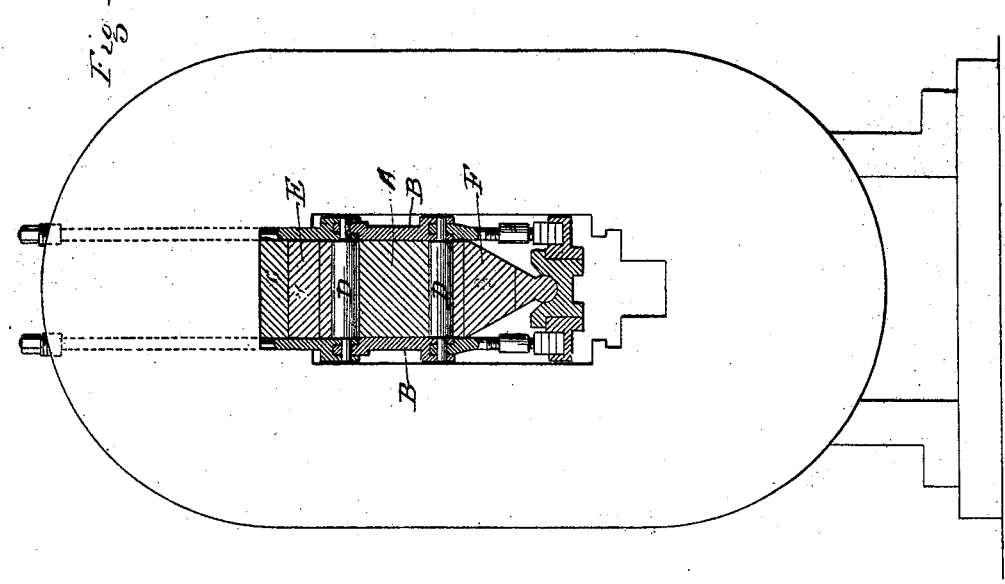

Figure 1 represents a section of a portion of a coin-press with my improvements attached. Fig. 2 shows a front sectional view of same. Fig. 3 is a detached view of head-block. Fig. 4 is a detached view of lever-arm. Fig. 5 is a detached view of center-piece. Figs. 6 and 7 are views of the link. Fig. 8 is a plan view of lever-arm.

My invention relates to presses for stamping coins; and it consists of the combination of devices hereinafter explained and claimed.

To enable others skilled in the art to make and use my invention, I will proceed to describe the exact manner in which I have carried it out.

In the drawings, A represents the lever-arm, with its head $a$ wide enough to receive and hold in dovetail recesses $b$ the side links, B, formed as shown in Figs. 6 and 7. The dovetail recess $b$ is countersunk at $b'$, to receive the projecting wings $c\ c$ on each side of the lower ends of the links.

The upper ends of the side links connect, in the usual way, to the suspension-rods passing through the arch of the press, and the lower ends connect, as usual, with triangles.

It will be observed that my pin-bearings D extend the full distance across the head of the lever-arm, between the side links, as shown in Fig. 8, and are not cut away for the purpose of inserting washers, as heretofore practiced.

The head-block E and center-piece F are constructed with the dovetail mortise $e\ f$ for the reception of movable bearings $i\ i$, of hardened steel. Heretofore these parts have been made of solid metal, and the process of hardening so large a mass of metal was attended with great risk and uncertainty.

The pin-bearing has to be hardened, and the sudden cooling necessary to accomplish this renders the whole piece hard and brittle, and consequently unable to withstand the immense strain to which it is subjected during the working of the press. The center-piece in a full-sized working press is eight and a half inches wide, seven and a half inches long, and four and a quarter inches thick.

It is well known that a piece of steel of these dimensions to be properly annealed requires from fifty to sixty hours to cool off, while in the effort to harden the pin-bearing the whole piece is cooled in less than fifteen minutes. It is to overcome this difficulty that I have used the movable hard steel bearings $i$, inserted in the dovetail grooves $e$, as above described.

Another great advantage gained by my use of the removable bearings is, that the center-piece and head-block need not be made of steel, as heretofore, thus effecting a great saving in the cost of material.

Having thus described my invention, what I claim to be new, and desire to secure by Letters Patent, is—

In a coin-press, the lever-arm A, provided with the recessed head $a$, pin-bearings D, head-block E, and center-piece F, in combination with the links B, provided with the wings $c\ c$, substantially as described.

THOMAS SCOTT.

Witnesses:
L. D. CRAIG,
F. R. CONWAY.